US 6,595,551 B2

(12) United States Patent
Hendey

(10) Patent No.: US 6,595,551 B2
(45) Date of Patent: Jul. 22, 2003

(54) BREAK-AWAY LOCK FOR A FIRE HYDRANT WATER METER

(76) Inventor: Arthur A. Hendey, P.O. Box 529, Beaumont, CA (US) 92223

( * ) Notice: Subject to any disclaimer, the term of this patent is extended or adjusted under 35 U.S.C. 154(b) by 0 days.

(21) Appl. No.: 09/799,132

(22) Filed: Mar. 5, 2001

(65) Prior Publication Data

US 2002/0121776 A1 Sep. 5, 2002

(51) Int. Cl.[7] ............................................... F16L 35/00
(52) U.S. Cl. ........................ 285/3; 285/276; 248/229.1
(58) Field of Search ............................ 285/1, 2, 3, 45, 285/276; 137/296, 614.04; 248/229.1

(56) References Cited

U.S. PATENT DOCUMENTS

| | | | | |
|---|---|---|---|---|
| 4,805,862 A | * | 2/1989 | Wissman | 248/229.1 |
| 5,312,137 A | * | 5/1994 | Nee | 285/45 |
| 5,547,233 A | * | 8/1996 | Hoegger | 285/276 |
| 5,718,265 A | * | 2/1998 | Elsdon et al. | 285/45 |
| 6,053,539 A | * | 4/2000 | Bravo | 285/276 |
| 6,164,707 A | * | 12/2000 | Ungchusri et al. | 285/276 |
| 6,363,782 B1 | * | 4/2002 | Hendey | 73/276 |

* cited by examiner

Primary Examiner—Lynne H. Browne
Assistant Examiner—Aaron Dunwoody
(74) Attorney, Agent, or Firm—Morland C. Fischer

(57) ABSTRACT

A break-away lock to secure a fire hydrant water meter to a fire hydrant so as to stop thieves and dishonest building contractors from removing the water meter from the fire hydrant. The break-away lock is advantageously adapted to permit the water meter to automatically separate from the fire hydrant in the event that a pulling force is applied to a water supply hose connected between a water tanker truck and the water meter to prevent a possible unearthing of the fire hydrant should the truck inadvertently pull away from the fire hydrant without first detaching the hose from the water meter. The break-away lock includes a swivel connected to the fire hydrant, a slide-out coupler, one end of which is connected to the water meter and the opposite end of which is slideably received by the swivel, and an outer clamping shell surrounding the swivel and slide-out coupler to deny unauthorized access thereto.

17 Claims, 5 Drawing Sheets

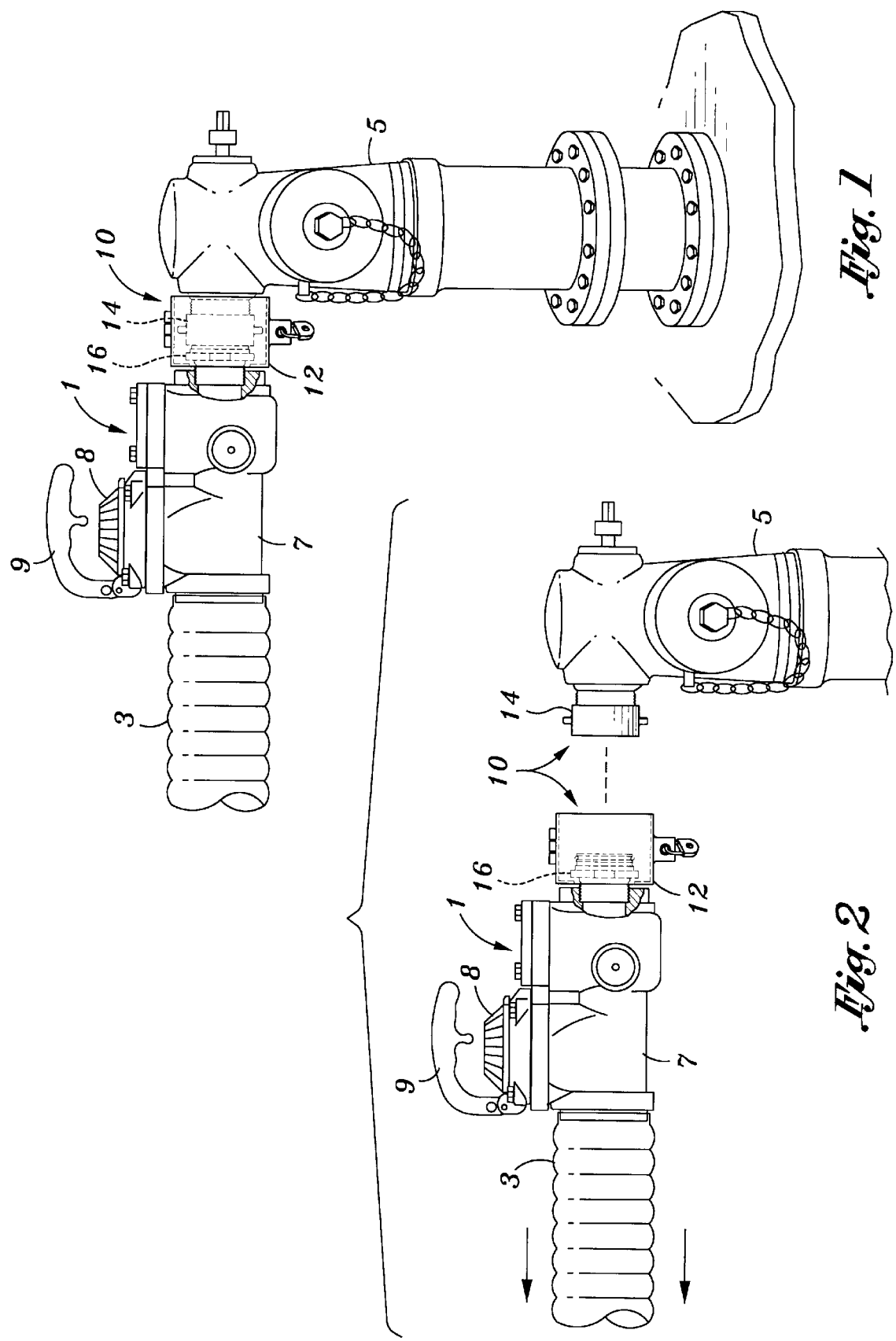

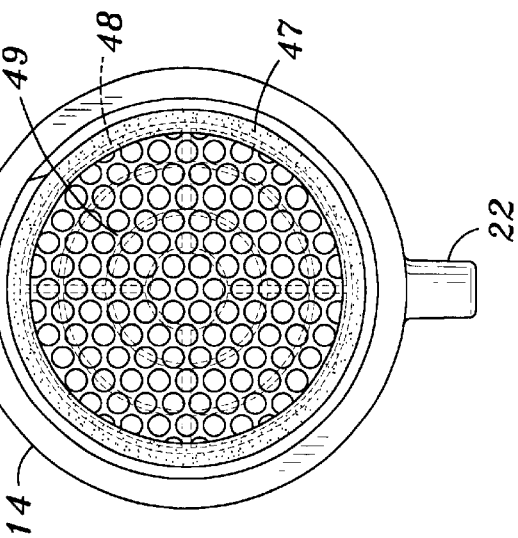
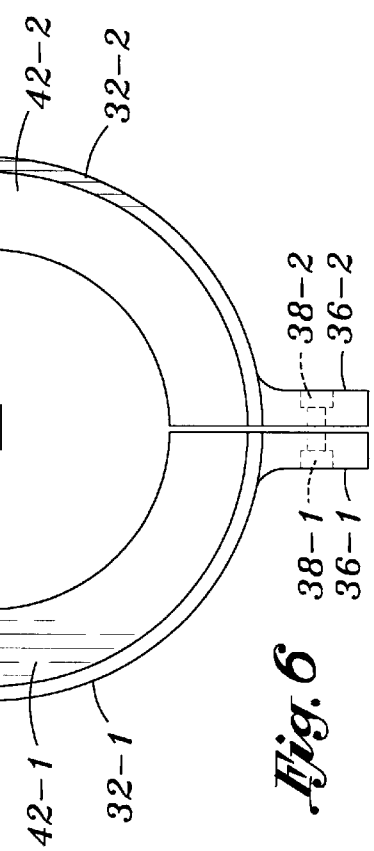
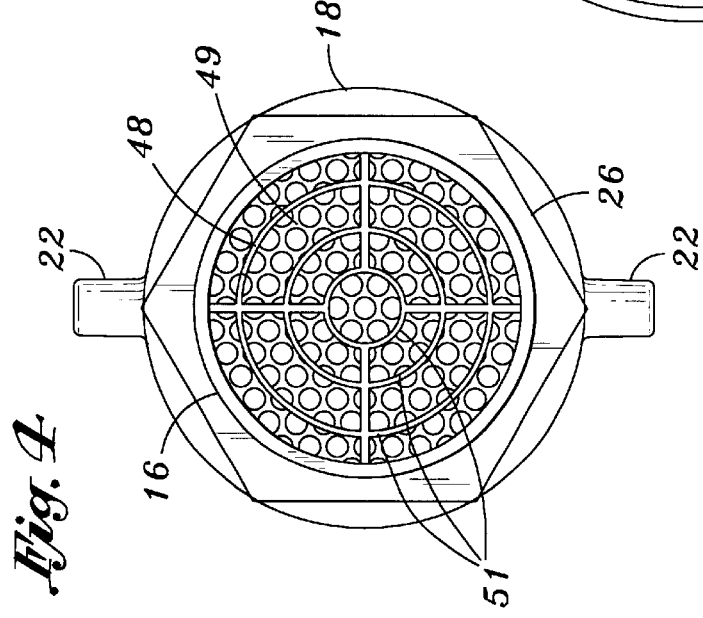

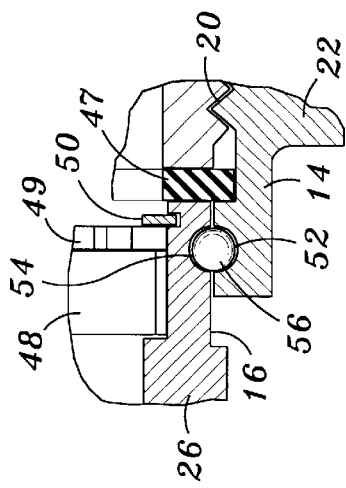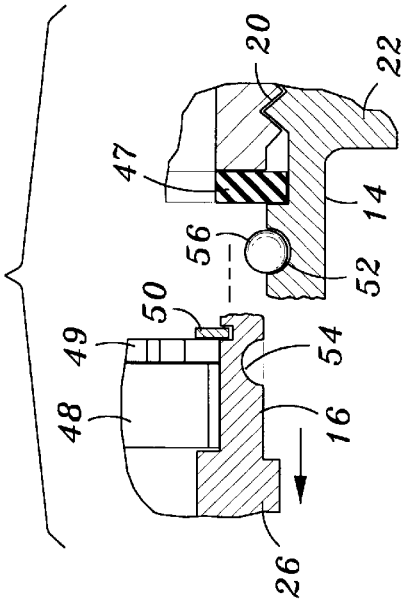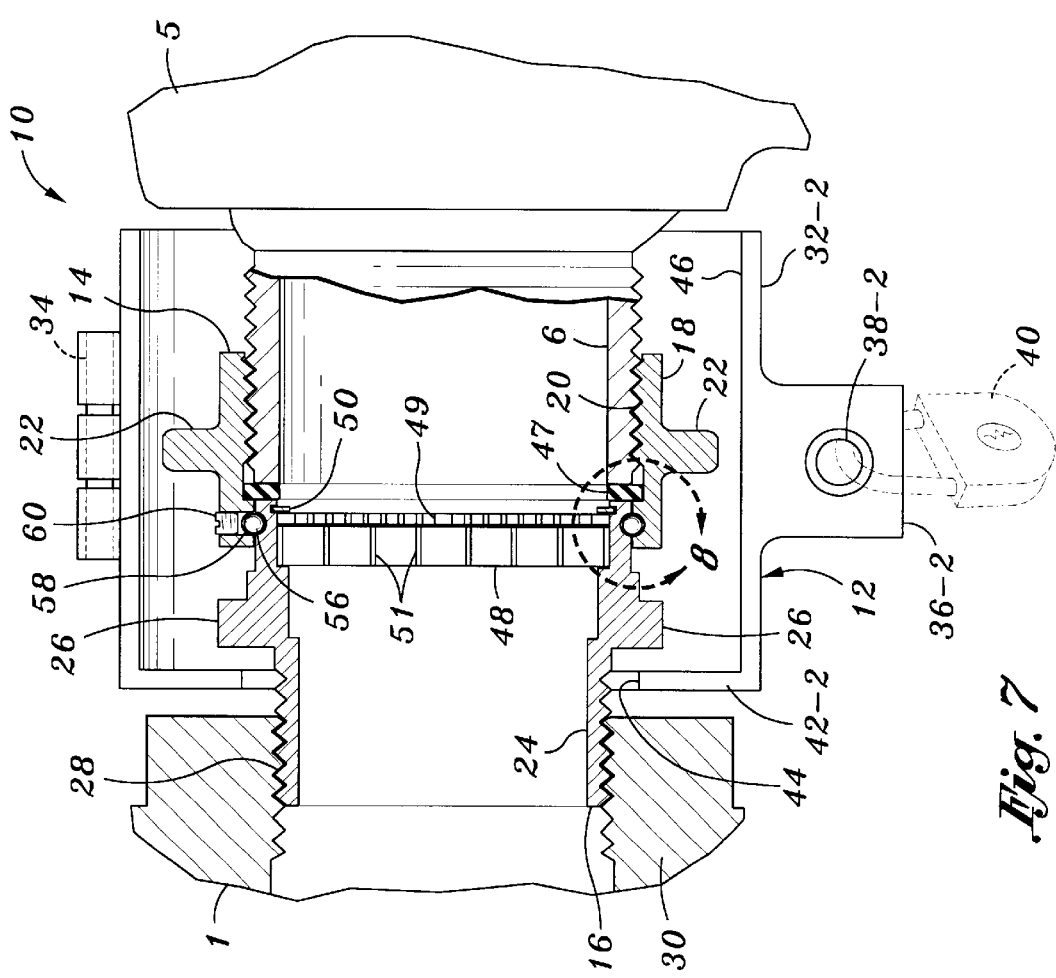

BREAK-AWAY LOCK FOR A FIRE HYDRANT WATER METER

BACKGROUND OF THE INVENTION

1. Field of the Invention

This invention relates to a break-away lock to be used to secure a fire hydrant water meter to a fire hydrant so as to stop thieves, dishonest building contractors, and other unauthorized individuals from removing the water meter from the fire hydrant so as to avoid a theft of the water meter and the underpayment of monies owed to a municipality or public utility for water actually consumed at the fire hydrant. The break-away lock is advantageously adapted to permit the water meter to automatically separate from the fire hydrant in the event that a pulling force is applied to a water supply hose connected between a water tanker truck and the water meter to prevent a possible unearthing of the fire hydrant should the truck inadvertently pull away from the fire hydrant without first detaching the hose from the water meter.

2. Background Art

Often, when building contractors are in need of water for use at a construction site, they will purchase the required supply from a municipality or a public utility. One common source of such water for filling a tanker truck or other storage means is a fire hydrant. In order to determine the payment due the municipality or utility, a water meter is coupled to the fire hydrant to determine the volume of water consumed by the contractor. The greater the volume consumed, the more that is owed by the contractor. However, to avoid or unfairly reduce its payments, some contractors have been known to exchange one water meter for another so as to produce a false reading and an underpayment of the monies owed. Other contractors have been known to remove the water meter altogether from the fire hydrant during periods of high water consumption so as to deprive the municipality or utility of revenue.

Conventional water meters are often manufactured from aluminum. In this regard, thieves have been known to remove a water meter from a fire hydrant to be sold as scrap. This situation creates a waste of resources and, to some extent, higher water bills passed on to consumers.

What is even more, with a fire hydrant water meter properly installed between a water supply hose at one side thereof and the fire hydrant at the opposite side, it has been known for water tanker truck operators to inadvertently drive away from the fire hydrant with the water supply hose still connected to the water meter. Consequently, a strong pulling force will be applied by the tanker truck to the fire hydrant via the water supply line including the water meter. As an undesirable result of the foregoing, the fire hydrant could be pulled out of the ground. The negative effects and the damages associated with having the fire hydrant unearthed should be apparent.

Therefore, what is needed is a relatively low cost, easy to use lock to be connected between a water meter and a fire hydrant by which to reliably stop the unauthorized removal of the water meter from the fire hydrant while, at the same time, being adapted to automatically separate from the fire hydrant in the event that the operator of a tanker truck drives off with the water supply hose still connected between the truck and the water meter.

SUMMARY OF THE INVENTION

A break-away lock is disclosed to reliably retain a fire hydrant water meter connected to a fire hydrant so as to stop thieves and dishonest building contractors from removing the water meter in order to prevent a theft thereof and/or a substitution of one water meter for another in an attempt to underpay for water consumed from a municipal water supply A water supply hose is connected from a water tanker truck, or the like, to the fire hydrant water meter, and the break-away lock is connected between the water meter and the fire hydrant. The break-away lock of this invention is advantageously adapted to permit an automatic separation of the water meter from the fire hydrant and avoid a possible unearthing of the fire hydrant in the event that the tanker truck pulls away from the fire hydrant with the water supply hose still connected between the truck and the water meter.

The break-away lock includes the detachable connection of a swivel that is rotated into connection with the fire hydrant and a slide-out coupler that is connected at one end thereof to the swivel and at the opposite end to the fire hydrant water meter to complete a flow path between the fire hydrant and the water supply hose. More particularly, the proximal end of the slide-out coupler is received within and frictionally engaged by the distal end of the swivel, and a plurality of ball bearings are located within a circumferential channel at the intersection of the swivel and slide-out coupler. The break-away lock also includes an outer clamping shell comprising a pair of semi-circular locking halves that are locked together so as to surround the swivel and the slide-out coupler for denying access thereto and stopping an unauthorized detachment of the water meter from the fire hydrant.

Should the tanker truck drive off with the water supply hose still connected to the fire hydrant water meter, a strong pulling force will be applied to the water meter via the hose. This strong pulling force is transferred from the water meter to the slide-out coupler that is surrounded by the outer clamping shell. Accordingly, the frictional engagement between the proximal end of the slide-out coupler and the distal end of the swivel of the break-away lock will be broken, and the slide-out coupler will be pulled away from the swivel and outwardly from the outer clamping shell in response to the pulling force applied to the water supply hose. The ball bearings that are located in the circumferential channel at the intersection of the slide-out coupler with the swivel of the break-away lock facilitate the detachment of the coupler from the swivel. By virtue of the foregoing, the strong pulling force applied to the fire hydrant water meter and the slide-out coupler connected thereto will not also be applied to the fire hydrant, whereby to avoid an unearthing of the fire hydrant and the damages associated therewith.

BRIEF DESCRIPTION OF THE DRAWINGS

FIG. 1 shows a water supply hose and a fire hydrant water meter securely connected to a fire hydrant by means of the break-away lock which forms the present invention;

FIG. 2 illustrates the break-away feature of the break-away lock of FIG. 1 by which to permit the water meter to automatically separate from the fire hydrant should a tanker truck to which the water supply hose is connected inadvertently drive off with the fire hydrant water meter still connected to the fire hydrant;

FIG. 4 is a first side view taken in the direction of lines 4—4 of FIG. 3;

FIG. 5 is an opposite side view taken in the direction of lines 5—5 of FIG. 3;

FIG. 6 is a side view showing semi-circular lock body halves which are rotated together to form a clamping shell of the break-away lock of this invention that are held together in a locked configuration;

FIG. 7 is a cross-section showing the detachable connection of a swivel to a slide-out coupler of the break-away lock of this invention, surrounded by the clamping shell of FIG. 6;

FIG. 8 is an enlarged detail taken from FIG. 7 to illustrate the detachable connection of the slide-out coupler to the swivel of the break-away lock of FIG. 7;

FIG. 9 shows the slide-out coupler of FIG. 8 being automatically disconnected from the swivel to permit the fire hydrant water meter of FIG. 1 to be separated from the fire hydrant to avoid damages to the fire hydrant.

DETAILED DESCRIPTION

Figure 3:
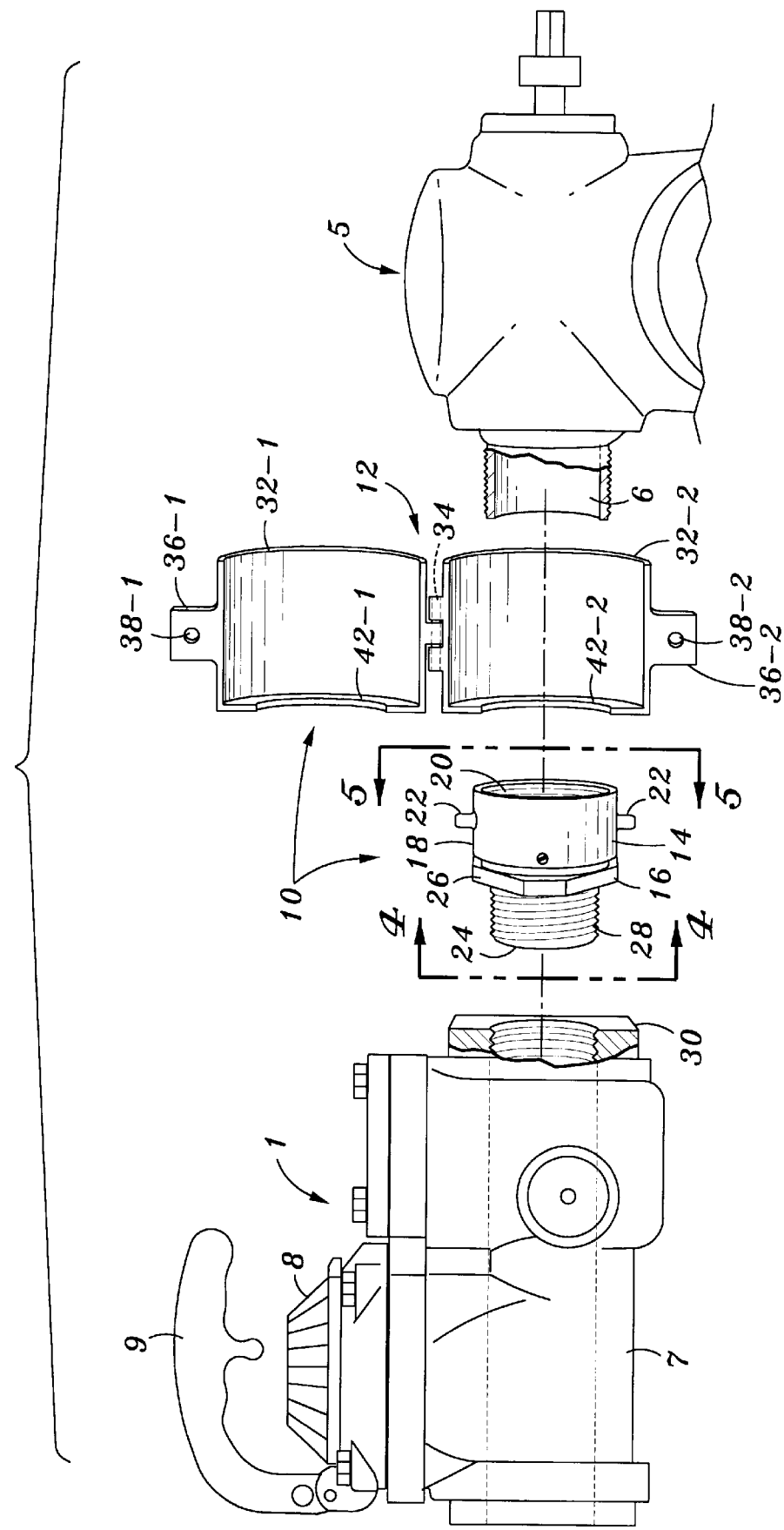
FIG. 3 is an exploded view of the break-away lock of this invention detachably connected between the fire hydrant water meter and the fire hydrant.

FIG. 1 of the drawings shows a conventional fire hydrant water meter 1 connected at one end thereof to a water supply hose 3 and at the opposite end to a standard fire hydrant 5 of the type that is used to enable fire fighters to fight fires in the vicinity of the fire hydrant. In this case, the water supply hose 3 is connected to a tanker truck, or the like, so that the truck can be filled with water to be transported to a remote location. By way of example, the tanker truck may be either a fire truck or a truck used by building contractors to carry water to a construction site. The water meter 1 includes a hollow body 7 within which a flow turbine (not shown) is located to measure the volume of water being consumed from the municipal water supply at the fire hydrant 5 and delivered to the tanker truck via the water supply hose 3, a register 8 which provides a visual indication of water consumption, and a handle 9 by which to transport the water meter 1 from place-to-place.

The water meter 1 is removable connected to and reliably retained at the fire hydrant 5 by means of a unique break-away lock 10 which forms the present invention. The break-away lock 10 includes an outer clamping shell 12 by which to stop an unauthorized removal of the water meter 1 from the fire hydrant 5 and a combination swivel 14 and slide-out coupler 16 that are detachably connected to one another and surrounded by the clamping shell 12. As is best illustrated in FIG. 2, and as will be described in greater detail hereinafter, the slide-out coupler 16 is adapted to automatically separate and pull away from the swivel 14 in response to a strong pulling force applied to the water meter 1 via the water supply hose 3 in the event that the tanker truck drives away from the fire hydrant 5 with hose 3 still connected between the truck and the water meter. By virtue of the foregoing, the tanker truck will not accidentally pull the fire hydrant out of the ground with the resultant damages associated therewith.

Details of the break-away lock 10 are now described while referring to FIG. 3 of drawings. The swivel 14 from the combination swivel 14 and slide-out coupler 16 includes a hollow cylindrical swivel body 18, the proximal end of which having a series of screw threads 20 extending around the interior thereof. A pair of lugs 22 project outwardly from opposite sides of the body 18 of swivel 14. By applying a rotational force to the lugs 22, the internal screw threads 20 of swivel body 18 are mated to corresponding external screw threads from the existing spout 6 of the fire hydrant 5, whereby the swivel 14 of break-away lock 10 is removably connected to the fire hydrant The slide-out coupler 16 of break-away lock 10 includes a hollow, cylindrical coupler body 24 having a wrench pad surface 26 formed around the proximal end thereof and a set of screw threads 28 formed around the exterior of the distal end. By applying a torque with a suitable tool to the wrench pad surface 26, the external screw threads 28 of coupler body 24 will be mated to corresponding internal screw threads at an existing water inlet port 30 of water meter 1, whereby the slide-out coupler 16 is removably connected to the water meter. With the swivel 14 connected to fire hydrant 5 and the slide-out coupler 16 connected to water meter 1, a flow path is completed between the fire hydrant 5 and the water meter 1.

To prevent the unauthorized separation of the combination swivel 14 and slide-out coupler 16 from the flow path between the water meter 1 and the fire hydrant 5 and thereby stop the removal of the water meter 1 by thieves and dishonest contractors, the outer clamping shell 12 of break-away lock 10 surrounds the lugs 22 of swivel 14 and the wrench pad surface 26 of slide-out coupler 16 (best shown in FIG. 7). Clamping shell 12 includes a pair of semi-circular locking halves 32-1 and 32-2 that are hingedly connected together and rotateable relative to one another around a hinge pin 34. Each of the locking halves 32-1 and 32-2 of clamping shell 12 has a tab 36-1 and 36-2 projecting therefrom and respective holes 38-1 and 38-2 formed through the tabs. In the assembled, locked configuration shown in FIG. 7, the locking halves 32-1 and 32-2 of clamping shell 12 are rotated towards and into opposing engagement such that the tabs 36-1 and 36-2 are aligned face-to-face one another. A conventional lock 40 (also best shown in FIG. 7) may then be inserted through the holes 38-1 and 38-2 of tabs 36-1 and 36-2 to hold the locking halves 32-1 and 32-2 together, so as to deny access to the lugs 22 of swivel 14 and the wrench pad surface 26 of slide-out coupler 16.

As an important detail of the clamping shell 12 of break-away lock 10, and as is best illustrated at FIG. 6 of the drawings, a lip 42-1 and 42-2 surrounds the distal end of each of the locking halves 32-1 and 32-2. Thus, and as is best shown in the locked configuration of FIG. 7, a relatively narrow opening 44 is established at the distal end of clamping shell 12. Distal opening 44 has a particular diameter that is greater than the diameter of the threaded distal end 28 of the slide-out coupler 16, but smaller than the outside diameter of the wrench pad surface 26 around the proximal end of coupler 16. However, the proximal end of each locking half 32-1 and 32-2 of clamping shell 12 is devoid of the aforementioned lips 42-1 and 42-2, so as to establish a relatively wide opening 46 (also best shown in FIG. 7) at the proximal end of clamping shell 12. Proximal opening 46 has a diameter that is sized to be large enough to encircle the lugs 22 that project from swivel 14. The advantage of a relatively narrow diameter opening 44 at the distal end of clamping shell 12 and a relatively wide diameter opening 46 at the proximal end thereof will be described at the same time that the unique break-away feature of the break-away lock 10 is also described.

Turning now to FIGS. 4, 5 and 7 of the drawings, the swivel 14 and the slide-out coupler 16 of break-away lock 10 are shown detachably connected together and surrounded by the locking halves 32-1 and 32-2 of clamping shell 12. A resilient sealing ring or gasket 47 extends circumferentially around the distal end of the swivel 14 to prevent leakage at the interface of swivel 14 and slide-out coupler 16. A screen 49 is supported at the proximal end of the slide-out coupler 16 by means of a screen support 48 that is located at one side of the screen 49 and a circumferential retaining ring 50 that is located at the opposite side of the screen 49. The screen 49 extends transversely across the flow path through slide-out coupler 16.

As is best shown in FIG. 5, the screen 49 is provided with a plurality of perforations so as to slow and smooth the water being conveyed through the flow path between the fire hydrant 5 and the water meter 1 and trap any sediment or debris that is carried by the water supply. The screen support 48 is shown in FIG. 4 as having a series of coaxially aligned rings 51 that are evenly spaced from one another to lend back support to the screen 49 to hold the screen in place within slide-out coupler 16 in response to a rapid and turbulent flow of water through the flow path from the fire hydrant 5 to the water meter 1.

The detachable connection of the slide-out coupler 16 to the swivel 14 to provide the break-away lock 10 with a unique break-away feature and thereby avoid a possible unearthing of the fire hydrant to which the water meter is secured with lock 10 in the locked configuration is now disclosed while referring concurrently to FIGS. 7–9 of the drawings. As shown in FIG. 8, a groove 52 extends continuously around the distal end of the swivel 14. A complementary groove 54 extends continuously around the proximal end of the slide-out coupler 16. In the locked configuration of FIG. 7, the proximal end of slide-out coupler 16 is received inwardly of and frictionally engaged by the distal end of the swivel 14, whereby the swivel 14 and slide-out coupler 16 are detachably connected together. The complimentary grooves 54 and 52 are aligned one above the other to form a circumferential channel at the interface of swivel 14 with coupler 16.

As also shown in FIG. 8, a plurality of ball bearings 56 are received within the circumferential channel formed by the opposing grooves 52 and 54 of swivel 14 and slide-out coupler 16. The ball bearings 56 are loaded into the circumferential channel via a slot 58 (of FIG. 7) that extends through the swivel 14 to communicate with grooves 52 and 54. Once the grooves 52 and 54 are loaded with ball bearings 56, the slot 58 is closed by a means of a suitable closure (e.g., screw 60) to prevent a removal of the ball bearings.

Should the tanker truck drive off with the water supply hose (designated 3 in FIGS. 1 and 2) still connected to the fire hydrant water meter 1, a strong pulling force will be applied to the water meter via the hose. This strong pulling force will be transferred from the water meter 1 to the slide-out coupler 16 that is surrounded by the outer clamping shell 12. Accordingly, the frictional engagement between the proximal end of slide-out coupler 16 and the distal end of swivel 14 will be broken, and the slide-out coupler 16 will be pulled away from the swivel and outwardly from the outer clamping shell 12 in response to the pulling force applied to the water supply hose 3.

As previously disclosed, the distal end of outer clamping shell 12 is provided with a relatively narrow opening 44, and the proximal end of clamping shell 12 is provided with a relatively wide opening 46. The relatively narrow distal opening 44 blocks an escape of the wrench pad surface 26 from the outer clamping shell 12 when the slide-out coupler 16 separates from the swivel 14. Thus, the wrench pad surface 26 of coupler 16 will move into contact with and pull the outer clamping shell 12 away from the fire hydrant at the same time that the slide-out coupler 16 separates from the swivel 14. In this same regard, the relatively wide proximal opening 46 of outer clamping shell 12 permits the clamping shell to clear the lugs 22 which project from the swivel 14 as the clamping shell is pulled away from the fire hydrant 5 during the separation of slide-out coupler 16 from swivel 14.

The detachment of the slide-out coupler 16 from the swivel 14 is facilitated by the ball bearings 56 that are located in the circumferential channel formed by complementary grooves 52 and 54 at the interface of coupler 16 with swivel 14. That is to say, the proximal end of the slide-out coupler will slide outwardly and separate from the distal end of the swivel 14 in response to the pulling force applied to the water meter 1 to which slide-out coupler 16 is connected. By virtue of the foregoing, the strong pulling force applied to the fire hydrant water meter 1 and the slide-out coupler 16 of break-away lock 10 will not be applied to the fire hydrant, whereby to prevent an unearthing of the fire hydrant and avoid the damages associated therewith. That is, and as is best illustrated in FIG. 2, the fire hydrant water meter 1, the slide-out coupler 16 connected to water meter 1, and the clamping shell 12 that is locked in surrounding engagement with coupler 16 will all be pulled away from the fire hydrant 5 by the water supply hose 3, leaving the swivel 14 in place and still removably connected to the fire hydrant 5. Therefore, it can be appreciated that the automatic separation of slide-out coupler 16 from swivel 14 leaves the fire hydrant 5 in an undamaged and ready to reuse condition.

Figure 10:
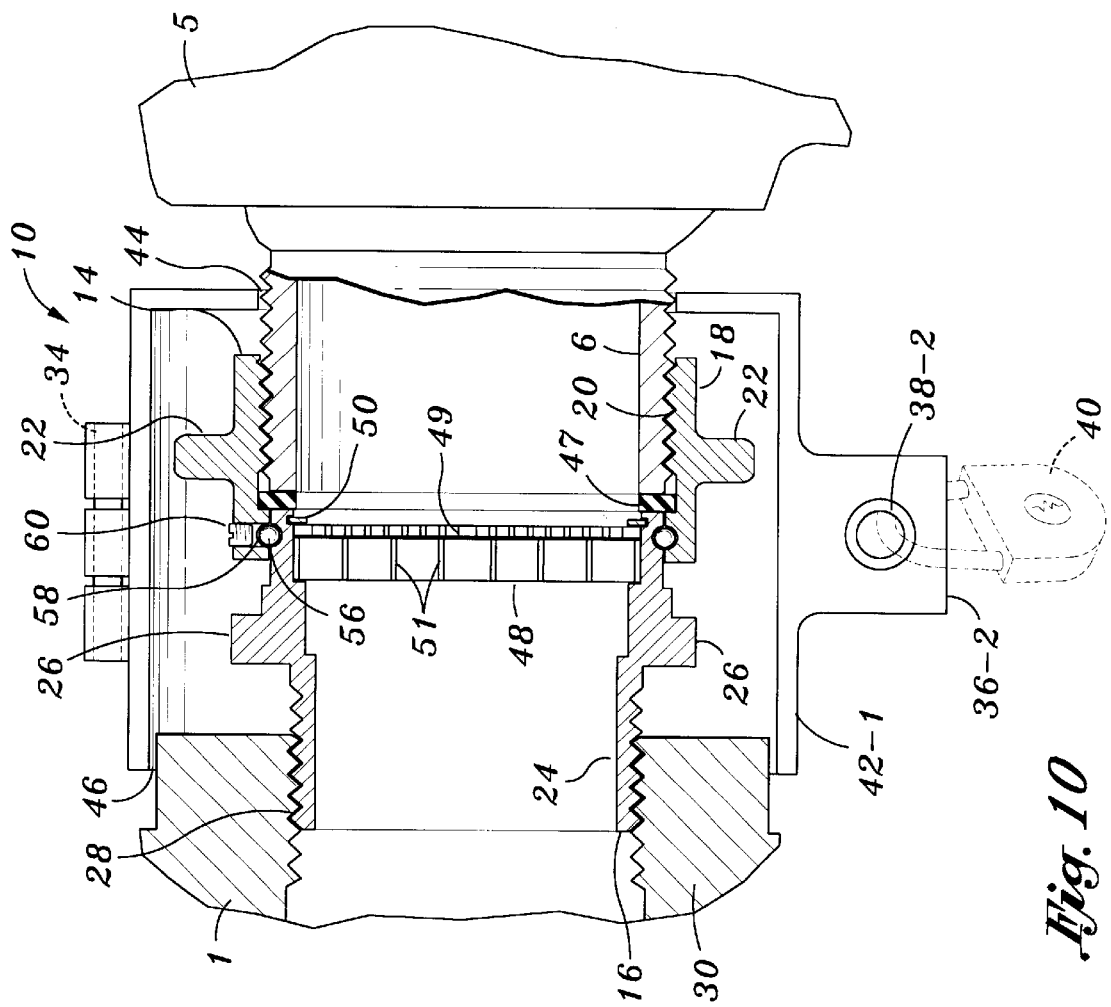
FIG. 10 shows the cross-section of the detachable connection illustrated in FIG. 7 with the orientation of the clamping shell reversed.

FIG. 10 shows a modification of the present invention that was illustrated and previously described when referring to FIG. 7. More particularly, FIG. 7 shows the outer clamping shell 12 surrounding the combination swivel 14 and slide-out coupler 16, such that the narrow opening 44 of clamping shell 12 lies behind the wrench pad surface 26 of slide-out coupler 16. In this case, the clamping shell 12 will be carried away with the fire hydrant water meter 1 and the slide-out coupler 16 attached thereto. However, it is also possible to reverse the orientation of the clamping shell 12, whereby the relatively narrow opening 44 thereof surrounds the spout 6 of fire hydrant 5 ahead of the wrench pad surface 26 of slide-out coupler 16 and the lugs 22 of the swivel 14. In this case, the clamping shell 12 will simply remain in place around the swivel 14 in the event that the slide-out coupler 16 is pulled away from swivel 14.

I claim:

1. A break-away lock for retaining a fire hydrant water meter connected to a fire hydrant and for permitting the water meter to be disconnected from the fire hydrant when a pulling force of particular magnitude is applied to the water meter, said break-away lock comprising first and second lock bodies, said first lock body removably connected to the fire hydrant and said second lock body having a distal end removably connected to the water meter and a proximal end releasably attached to said first lock body, such that said first and second lock bodies are attached to one another to couple the water meter to the fire hydrant and complete a flow path between the fire hydrant and the water meter, the proximal end of said second lock body adapted to automatically separate from said first lock body, whereby the water meter will be uncoupled from the fire hydrant in response to said pulling force applied to the water meter.

2. The break-away lock recited in claim 1, wherein said first lock body is a swivel having a plurality of lugs projecting outwardly therefrom, said swivel being removably connected to the fire hydrant in response to a rotation of said lugs.

3. The break-away lock recited in claim 2, wherein said second lock body is a coupler, the proximal end of said coupler being releasably attached to and held in frictional engagement with said swivel to couple the water meter to the fire hydrant, the proximal end of said coupler being pulled away and separated from said swivel to break the frictional engagement therebetween in response to said pulling force applied to the water meter.

4. The break-away lock recited in claim 3, wherein the proximal end of said coupler is slideably received by said swivel to be held in said frictional engagement therewith, said proximal end sliding out of said frictional engagement and away from said swivel in response to said pulling force applied to the water meter.

5. The break-away lock recited in claim 4, further comprising a plurality of ball bearings located at the interface of the proximal end of said coupler with said swivel, said plurality of ball bearings helping to break the frictional engagement between the proximal end of said coupler and said swivel to facilitate said proximal end sliding away from said swivel in response to said pulling force applied to the water meter.

6. The break-away lock recited in claim 5, further comprising a channel formed in at least one of the proximal end of said coupler and said swivel, said channel located around the interface of said proximal end with said swivel, said plurality of ball bearings received within said channel.

7. The break-away lock recited in claim 3, further comprising an outer clamping shell surrounding said coupler and said swivel and denying access to the plurality of lugs projecting from said swivel in order to prevent a rotation of said lugs and an unauthorized disconnection of said swivel from the fire hydrant.

8. The break-away lock recited in claim 7, wherein said outer clamping shell includes first and second hollow locking halves that are pivotally connected together to be rotated into opposing alignment with one another so as to surround and deny access to the plurality of lugs projecting from said swivel.

9. The break-away lock recited in claim 8, wherein each of said first and second hollow locking halves of said outer clamping shell has a proximal end and a distal end and a lip depending inwardly from each of the distal ends of said first and second locking halves to establish a distal opening in said outer clamping shell when said first and second locking halves are rotated into opposing alignment, the size of said distal opening being smaller than said coupler.

10. The break-away lock recited in claim 9, wherein each of the proximal ends of said first and second hollow locking halves of said outer clamping shell is open-ended to establish a proximal opening in said outer clamping shell when said first and second locking halves are rotated into opposing alignment, the size of said proximal opening being larger than the plurality of lugs projecting from said swivel, whereby said outer clamping shell is pulled past said swivel and away from the fire hydrant by said coupler at the same time that the proximal end of said coupler is pulled away and separated from said swivel in response to said pulling force applied to the water meter.

11. A break-away lock for retaining a fire hydrant water meter connected to a fire hydrant and for permitting the water meter to be disconnected from the fire hydrant when a pulling force of particular magnitude is applied to the water meter, said break-away lock comprising:

a swivel to be rotated into detachable connection with the fire hydrant;

a slide-out coupler having proximal and distal ends, said distal end to be detachably connected to the water meter and said proximal end to be slideably received and frictionally engaged by said swivel, such that said swivel and said coupler are attached to one another to couple the water meter to the fire hydrant and complete a flow path between the fire hydrant and the water meter, the proximal end of said coupler sliding away from said swivel to break the frictional engagement therebetween and detach said coupler from said swivel in response to said pulling force applied to the water meter; and an outer clamping shell surrounding said swivel and said coupler to deny access thereto and prevent an unauthorized disconnection of said swivel from the fire hydrant.

12. The break-away lock recited in claim 11, further comprising a plurality of ball bearings located at the interface of the proximal end of said coupler with said swivel, said plurality of ball bearings helping to break the frictional engagement between the proximal end of said coupler and said swivel to facilitate said proximal end sliding away from said swivel in response to said pulling force applied to the water meter.

13. The break-away lock recited in claim 12, further comprising a channel formed in each of the proximal end of said slide-out coupler and said swivel, said channel extending around the interface of the proximal end of said coupler with said swivel, and said plurality of ball bearings received within said channel.

14. The break-away lock recited in claim 11, wherein said swivel has a plurality of lugs projecting outwardly therefrom, said swivel being detachably connected to the fire hydrant in response to a rotation of said lugs.

15. The break-away lock recited in claim 11, wherein said outer clamping shell includes first and second hollow locking halves that are pivotally connected together to be rotated into opposing alignment with one another so as to surround and deny access to the said swivel.

16. The break-away lock recited in claim 15, wherein each of said first and second hollow locking halves of said outer clamping shell has a proximal end and a distal end and a lip depending inwardly from each of the distal ends of said first and second locking halves to establish a distal opening in said outer clamping shell when said first and second locking halves are rotated into opposing alignment, the size of said distal opening being smaller than the size of said slide-out coupler.

17. The break-away lock recited in claim 16, wherein each of the proximal ends of said first and second hollow locking halves of said outer clamping shell is open-ended to establish a proximal opening in said outer clamping shell when said first and second locking halves are rotated into opposing alignment with one another, the size of said proximal opening being larger than the size of said swivel, whereby said outer clamping shell is pulled past said swivel and away from the fire hydrant by said slide-out coupler at the same time that the proximal end of said slide-out coupler is pulled away and separated from said swivel in response to said pulling force applied to the water meter.

* * * * *